(12) United States Patent
Turek

(10) Patent No.: US 10,577,223 B2
(45) Date of Patent: Mar. 3, 2020

(54) MOVING WALKWAY

(71) Applicant: Otis Elevator Company, Farmington, CT (US)

(72) Inventor: Alexander Turek, Münchendorf (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/239,779

(22) Filed: Jan. 4, 2019

(65) Prior Publication Data

US 2019/0210842 A1    Jul. 11, 2019

(30) Foreign Application Priority Data

Jan. 10, 2018    (EP) .................................. 18150942

(51) Int. Cl.
| | | |
|---|---|---|
| B66B 21/00 | (2006.01) | |
| B65G 23/06 | (2006.01) | |
| B65G 23/12 | (2006.01) | |
| B66B 21/10 | (2006.01) | |
| B66B 23/02 | (2006.01) | |

(52) U.S. Cl.
CPC ............. *B66B 21/10* (2013.01); *B65G 23/06* (2013.01); *B65G 23/12* (2013.01); *B66B 23/026* (2013.01); *B66B 23/028* (2013.01)

(58) Field of Classification Search
CPC ..... B66B 21/10; B66B 23/026; B66B 23/028; B65G 23/06; B65G 23/12
USPC ................................. 198/327, 330, 332, 333
See application file for complete search history.

(56) References Cited

U.S. PATENT DOCUMENTS

| | | |
|---|---|---|
| 838,654 A | 12/1906 | Seeberger |
| 2,152,795 A | 4/1939 | Dunlop |
| 4,130,192 A | 12/1978 | Kraft |
| 4,576,276 A | 3/1986 | Boltrek et al. |

(Continued)

FOREIGN PATENT DOCUMENTS

| | | |
|---|---|---|
| CN | 85105326 A | 1/1987 |
| CN | 1308012 A | 8/2001 |

(Continued)

OTHER PUBLICATIONS

European Search Report for application EP 18150942.3, dated Jul. 24, 2018, 19 pages.

(Continued)

*Primary Examiner* — Douglas A Hess
(74) *Attorney, Agent, or Firm* — Cantor Colburn LLP

(57) ABSTRACT

A moving walkway comprises at least one endless belt moving in a conveyance direction along a closed loop. The closed loop comprises a conveyance portion and a return portion extending between opposite turnaround portions. A plurality of pallets is drivingly coupled to the belt. Each of the pallets comprises at least one first roller and at least one second roller, the first and second rollers being spaced apart from each other in the conveyance direction. The moving walkway further comprises at least one first guide rail portion and at least one second guide rail portion. The at least one first guide rail portion is configured for guiding and supporting the first rollers in the conveyance portion and in the turnaround portions, and the at least one second guide rail portion is configured for guiding and supporting the second rollers in the conveyance portion.

19 Claims, 9 Drawing Sheets

(56) References Cited

U.S. PATENT DOCUMENTS

| | | |
|---|---|---|
| 5,148,906 A | 9/1992 | Brunn |
| 5,161,668 A | 11/1992 | Datema et al. |
| 5,435,428 A | 7/1995 | Adachi et al. |
| 5,899,314 A | 5/1999 | Kwon |
| 6,016,902 A | 1/2000 | Kwon |
| 6,241,071 B1 * | 6/2001 | Yamashita ............ B66B 23/12 198/333 |
| 6,382,388 B1 * | 5/2002 | Hirai ................... B66B 23/147 198/332 |
| 6,540,060 B1 | 4/2003 | Fargo et al. |
| 6,832,678 B2 * | 12/2004 | Ogura ................. B66B 21/025 198/322 |
| 7,104,386 B2 | 9/2006 | Ogura et al. |
| 7,140,484 B2 * | 11/2006 | Stuffel .................. B66B 23/12 198/333 |
| 7,234,583 B2 | 6/2007 | Illedits et al. |
| 7,341,139 B2 | 3/2008 | Aulanko et al. |
| 7,344,015 B2 * | 3/2008 | Mustalahti ........... B65G 17/123 198/321 |
| 7,854,311 B2 * | 12/2010 | van der Werf ......... B66B 23/14 198/326 |
| 7,950,515 B2 | 5/2011 | Gonzalez |
| 8,931,614 B2 | 1/2015 | Senger |
| 9,193,568 B2 | 11/2015 | Inoue |
| 9,346,654 B2 | 5/2016 | Goldstein |
| 9,394,143 B2 | 7/2016 | Makovec |
| 9,637,351 B2 | 5/2017 | Dai et al. |
| 9,682,847 B2 | 6/2017 | Matheisl et al. |
| 9,718,647 B2 * | 8/2017 | Makovec ................ B66B 21/10 |
| 9,745,173 B2 | 8/2017 | Boros et al. |
| 9,994,427 B2 * | 6/2018 | Gonzalez Alemany ..................... B66B 21/12 |
| 10,308,482 B2 * | 6/2019 | Michalke ............. B66B 23/026 |
| 2017/0297873 A1 | 10/2017 | Turek |

FOREIGN PATENT DOCUMENTS

| | | |
|---|---|---|
| CN | 1874951 A | 12/2006 |
| CN | 103130083 A | 6/2013 |
| CN | 102849598 B | 9/2014 |
| DE | 102012110764 A1 | 5/2013 |
| EP | 0822918 B1 | 12/1999 |
| EP | 1452476 B1 | 9/2008 |
| EP | 1571114 B1 | 7/2012 |
| EP | 1852385 B1 | 1/2016 |
| GB | 197744 A | 5/1923 |
| JP | S5559054 A | 5/1980 |
| JP | 2005225600 A | 8/2005 |
| JP | 5474130 B2 | 4/2014 |
| KR | 101396320 B1 | 5/2014 |
| WO | 2016177414 A1 | 11/2016 |

OTHER PUBLICATIONS

Chinese Office Action for application CN 201910023092.8, dated Dec. 4, 2019, 25 pages.

\* cited by examiner

MOVING WALKWAY

The invention relates to a moving walkway, in particular to a belt driven moving walkway.

Moving walkways usually comprise a plurality of pallets drivingly coupled to a drive chain. The drive chain connects the pallets to each other forming an endless conveyance band moving along an upper conveyance portion and a lower return portion. In turnaround portions established at the ends of the moving walkway the pallets are transferred from the conveyance portion into the return portion and vice versa. Thus, additional space is needed at the ends of the moving walkway for establishing the turnaround portions.

It would be beneficial to provide an improved moving walkway which needs less space in particular in the turnaround portions.

According to an exemplary embodiment of the invention, a moving walkway comprises at least one endless belt, in particular a toothed belt, moving in a conveyance direction along a closed loop and a plurality of pallets drivingly coupled to the at least one belt. The closed loop comprises a conveyance portion and a return portion extending between opposite turnaround portions. Each of the pallets comprises at least one first roller and at least one second roller, the first and second rollers being spaced apart from each other in the conveyance direction. The moving walkway further comprises at least one first guide rail portion and at least one second guide rail portion. The at least one first guide rail portion is configured for guiding and supporting the first rollers in the conveyance portion and in the turnaround portion. The at least one second guide rail portion is configured for guiding and supporting the second rollers in the conveyance portion and for allowing free movement of the second rollers in the turnaround portions.

Allowing free movement of the second rollers in the turnaround portions allows reducing the diameter of the turnaround portions. In consequence, a moving walkway according to exemplary embodiments of the invention needs less space, in particular in the turnaround portions, than a conventional moving walkway.

A number of optional features are set out in the following. These features may be realized in particular embodiments, alone or in combination with any of the other features.

The first and second guide rail portions may be different portions of a common guide rail. Alternatively, the first and second guide rail portions may be provided as separate guide rails.

Each of the pallets extends in a longitudinal direction and in a lateral direction. The longitudinal direction is oriented parallel to the conveyance direction when the pallets travel in the conveyance portion or in the return portion. The lateral direction is oriented orthogonally to the conveyance direction.

Each of the pallets may be coupled to the at least one belt by a connection element arranged in between the first and second rollers in the conveyance direction. The connection elements may be rotatable with respect to the pallets and/or with respect to the at least one belt; i.e. at least one bearing allowing for a rotation between the pallet and the at least one belt may be arranged between each pallet and each connection element and/or between each connection element and the at least one belt. Such a configuration allows the at least one belt to guide the pallets around a turnaround portion having a reduced diameter.

The pallets in particular may be coupled to a neutral phase of the at least one belt, i.e. to a phase of the at least one belt which is neither compressed nor stretched when the at least one belt is bent when traveling in the turnaround portions. Fixing the pallets to the neutral phase of the at least one belt avoids generating additional shear forces in the at least one belt. Shear forces are undesirable as they reduce the lifetime of the at least one belt.

The at least one belt, the first rollers and the second rollers may be arranged within the width of the pallets in the lateral direction. The at least one belt, the first rollers and second rollers in particular may be arranged below the pallets when the pallets are traveling in the conveyance portion, and the at least one belt, the first rollers and the second rollers may be arranged above the pallets when the pallets are traveling in the return portion. Arranging at least one belt and the rollers above and/or below the pallets allows reducing the lateral dimension of the moving walkway as belts and rollers arranged above or below the pallets do not extend beyond the width of the pallets in the lateral direction.

The moving walkway may comprise at least one guide rail having at least one straight portion in the conveyance portion and/or in the return portion and at least one guide rail having at least one curved portion in the turnaround portions. The at least one straight portion may be configured for guiding the first and second rollers in the conveyance portion and/or in the return portion. The at least one curved portion may be configured for guiding the first rollers around at least one turnaround portion.

The at least one straight portion and the at least one curved portion may be different portions of a single guide rail. Alternatively, the at least one straight portion and the at least one curved portion may be provided as separate guide rails.

The at least one straight portion in particular may have a larger width than the curved portions in order to contact both, the first and second rollers, whereas the curved portions have a reduced width in order to contact only the first rollers.

The moving walkway may comprise at least one first guide rail and at least one second guide rail, the first and second guide rails being arranged in a common vertical plane extending parallel to the conveyance direction.

The curved portions in particular may extend along a circular arc. The radius of the circular arc of the first guide rail may be smaller than the radius of the circular arc of the second guide rail. The second guide rail in particular may form a closed loop with the first guide rail being arranged inside the closed loop formed by the second guide rail.

The center of the circular arc may be arranged coaxially with the center of the sprocket. Alternatively, the center of the circular arc may be shifted from the center of the sprocket in the conveyance direction in order to reduce the diameter of the turnaround portion.

Each pallet may comprise at least two first rollers and at least two second rollers for distributing the load of the pallets among a plurality of rollers. Each pallet in particular may comprise a first roller and a second roller on each lateral side of the pallet, respectively.

The at least two first rollers may be arranged coaxially with each other and/or the at least two second rollers may be arranged coaxially with each other. A common axle may be used for the coaxially arranged rollers. Thus, only two axles are necessary for supporting the plurality of rollers attached to each pallet.

The distance between the first rollers in the lateral direction may differ from the distance between the second rollers in the lateral direction. Such a configuration allows supporting the first and second rollers by different guide rails or different portions of guide rails arranged at different distances from the pallets in the lateral direction. It in particular allows supporting the first rollers and the second rollers by guide rails having a large width in the lateral direction in the conveyance portion and/or in the return portion, and supporting only the first rollers by narrow guide rails having a smaller width in the lateral direction in the turnaround portions.

The moving walkway may comprise at least two belts extending parallel to each other, wherein each pallet is connected to each of the belts. Employing a plurality of belts reduces the forces acting on each of the belts. It further provides redundancy so that the moving walkway may be operated at least in an emergency operation mode, e.g. with reduced speed, in case one of the belts should break.

In a configuration comprising at least two belts, the pallet rollers may be arranged between the at least two belts. Alternatively, the at least two belts may be arranged laterally between the rollers so that the rollers are arranged outside the at least two belts in the lateral direction.

In the following exemplary embodiments of the invention are described with reference to the enclosed figures.

FIG. 1 schematically depicts a side view of a moving walkway.

FIG. 2 schematically depicts a side view of a conveyance band of a moving walkway according to an exemplary embodiment of the invention.

FIG. 3 schematically depicts an enlarged side view of a portion of the conveyance band shown in FIG. 2 in and next to a turnaround portion.

FIG. 4 schematically depicts an enlarged perspective view of the portion of the conveyance band shown in FIGS. 2 and 3 in and next to a turnaround portion.

FIG. 5 schematically depicts a sectional view through the portion of the conveyance band shown in FIGS. 2 to 4 in and next to a turnaround portion in a vertical plane extending parallel to the conveyance direction.

Figure 1:
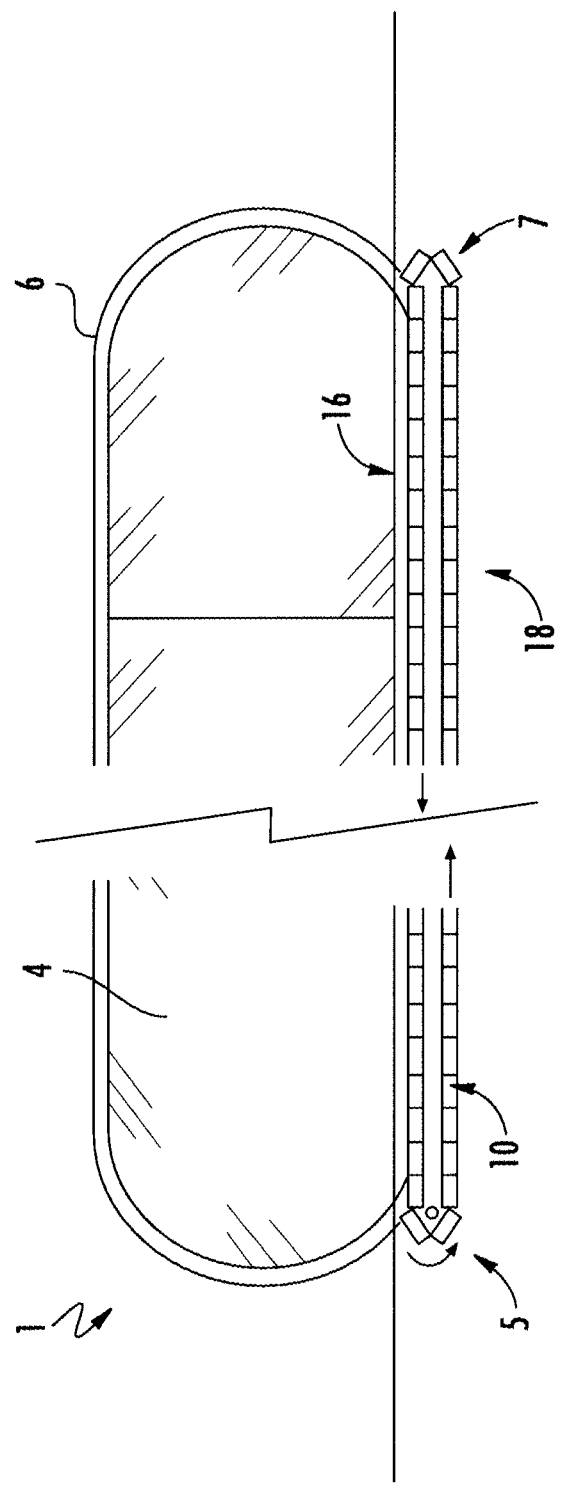

FIG. 1 schematically depicts a schematic side view of a moving walkway 1.

The moving walkway 1 comprises an endless conveyance band 10 moving in a conveyance direction in an upper conveyance portion 16 and opposite to the conveyance direction in a lower return portion 18. Turnaround portions 5, 7, are provided at both ends of the moving walkway 1. In the turnaround portions 5, 7 the conveyance band 10 passes from the conveyance portion 16 into the return portion 18, and vice versa.

Optionally balustrades 4 supporting moving handrails 6 extend parallel to the conveyance portion 16.

Figure 2:
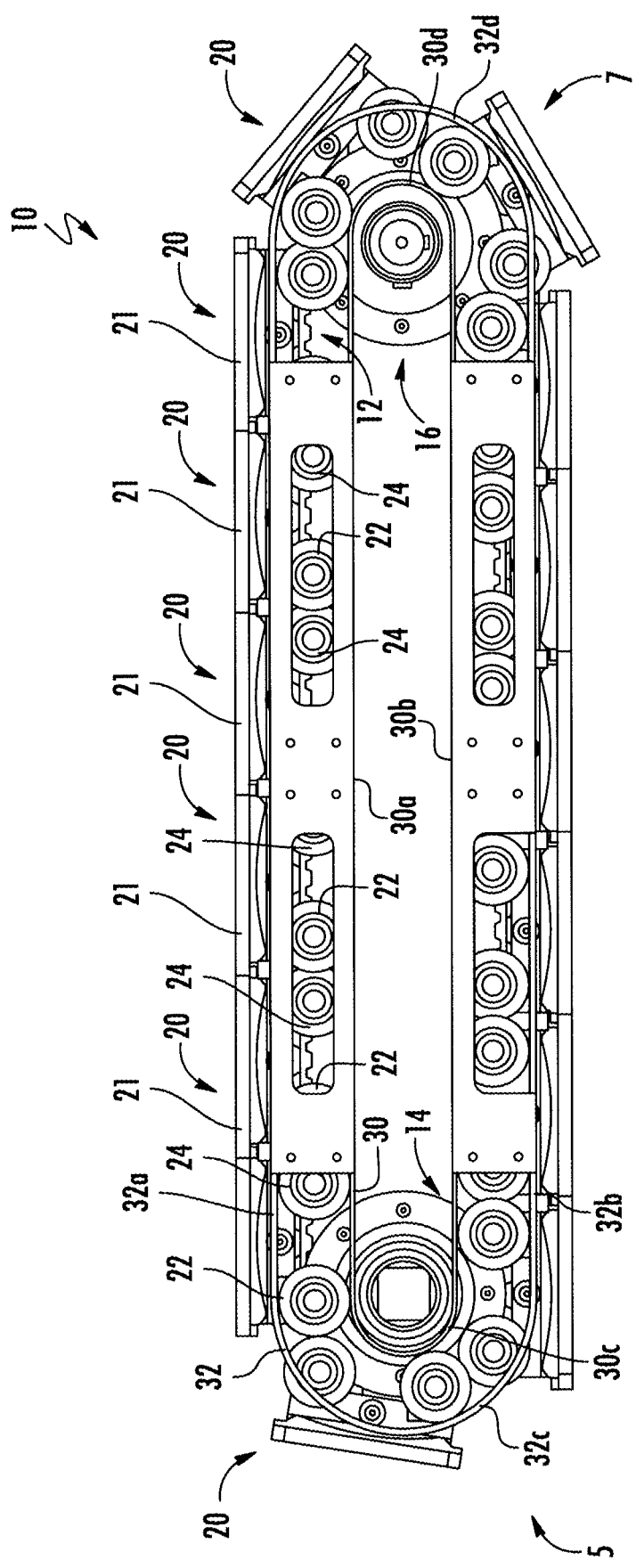
Figure 3:
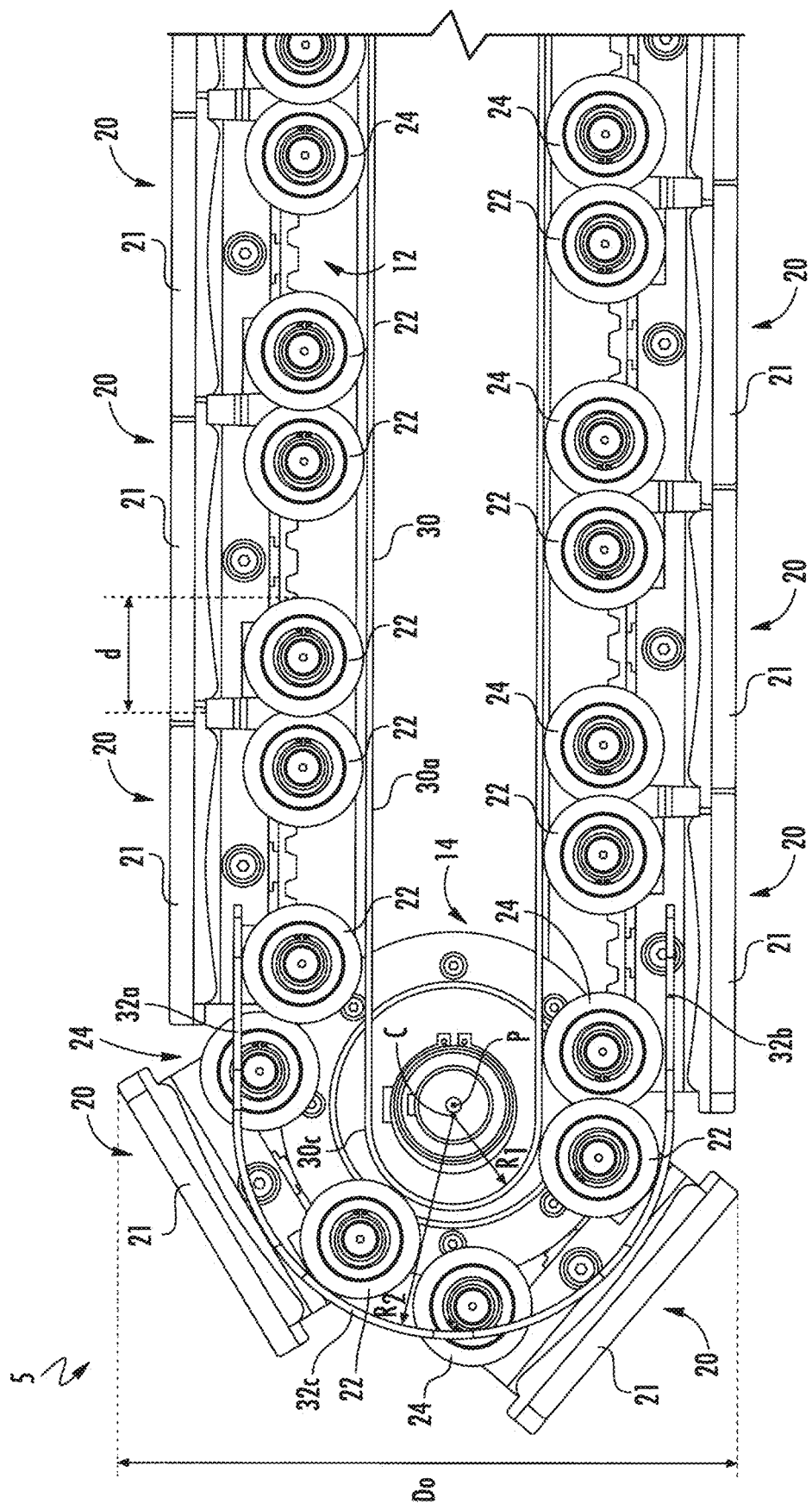
Figure 4:
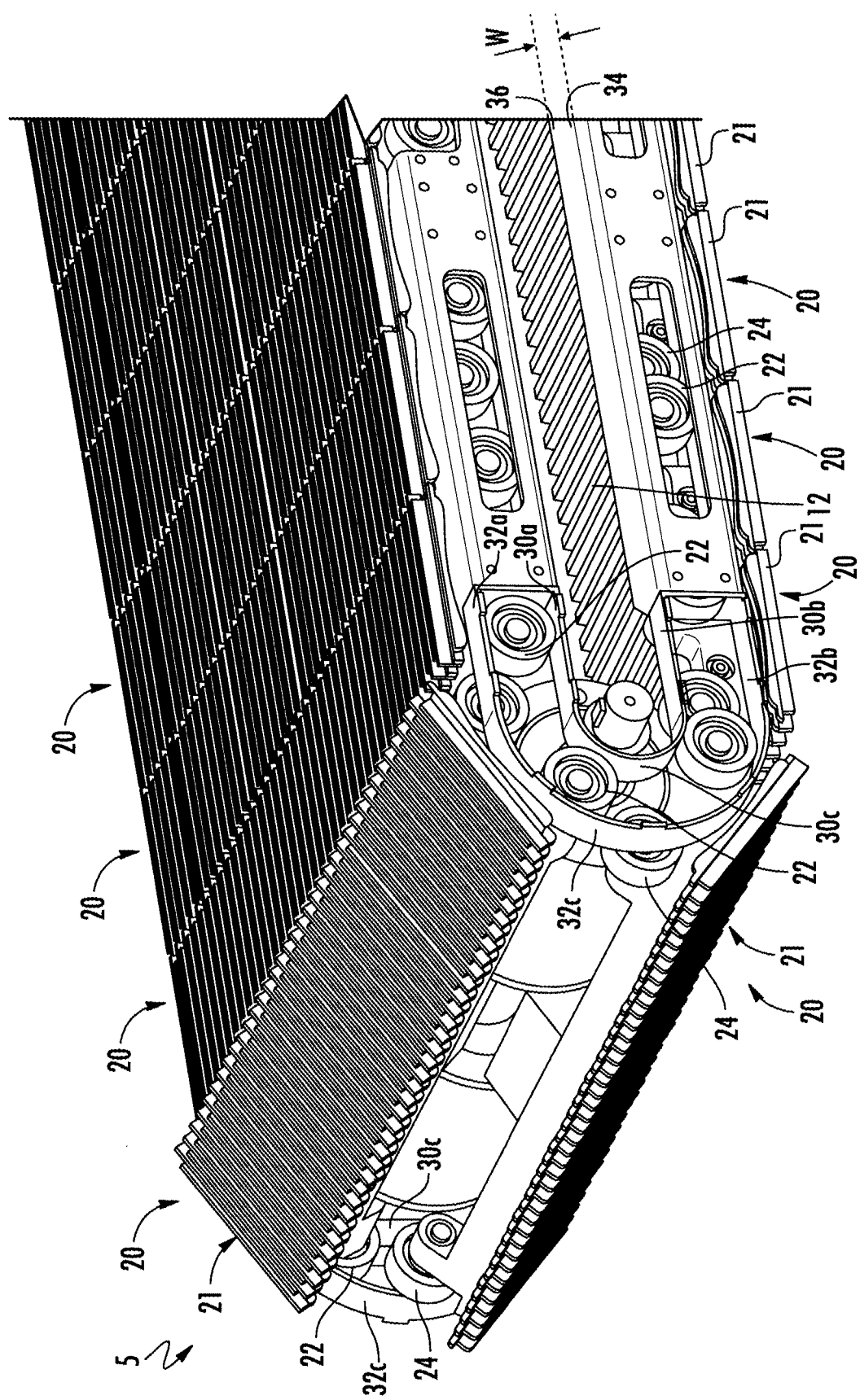
Figure 5:
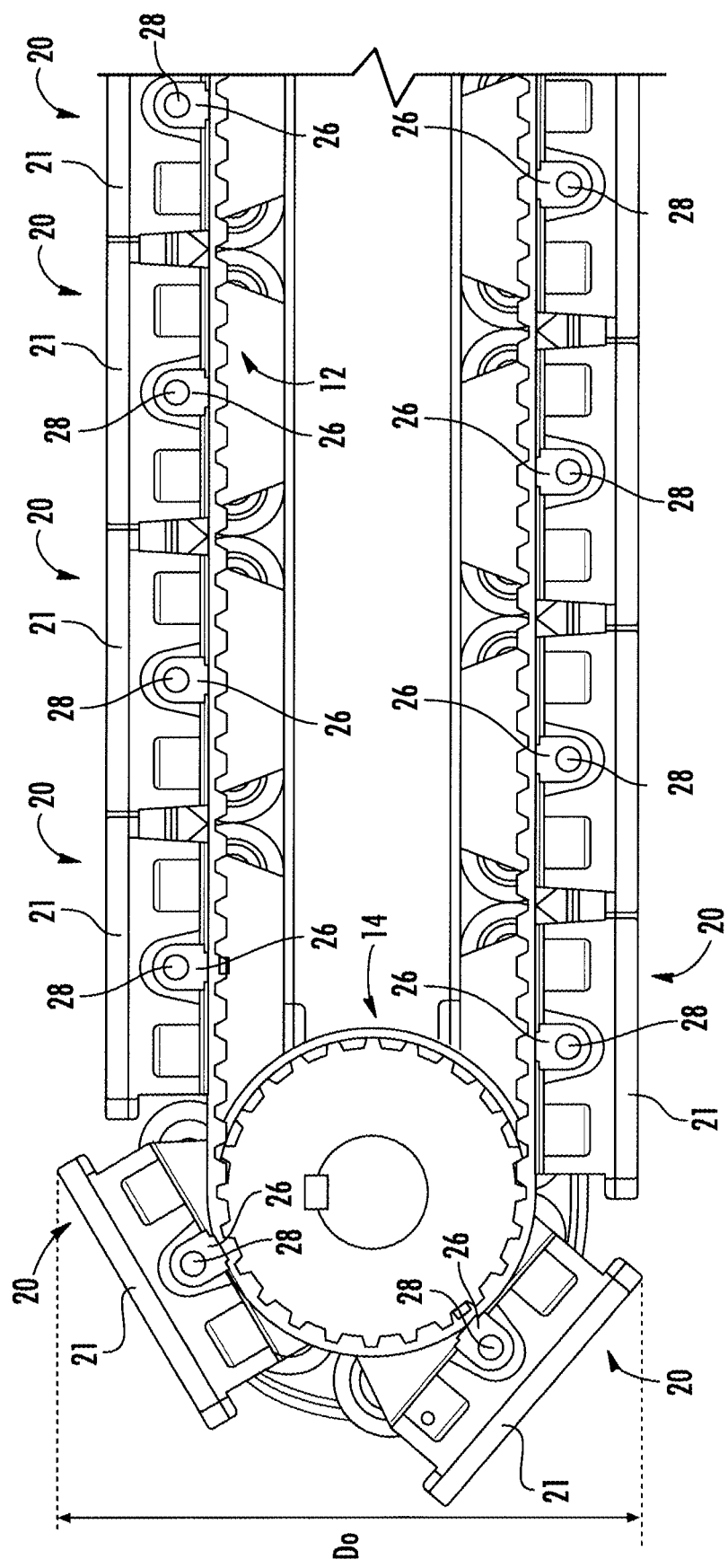
Figure 6:
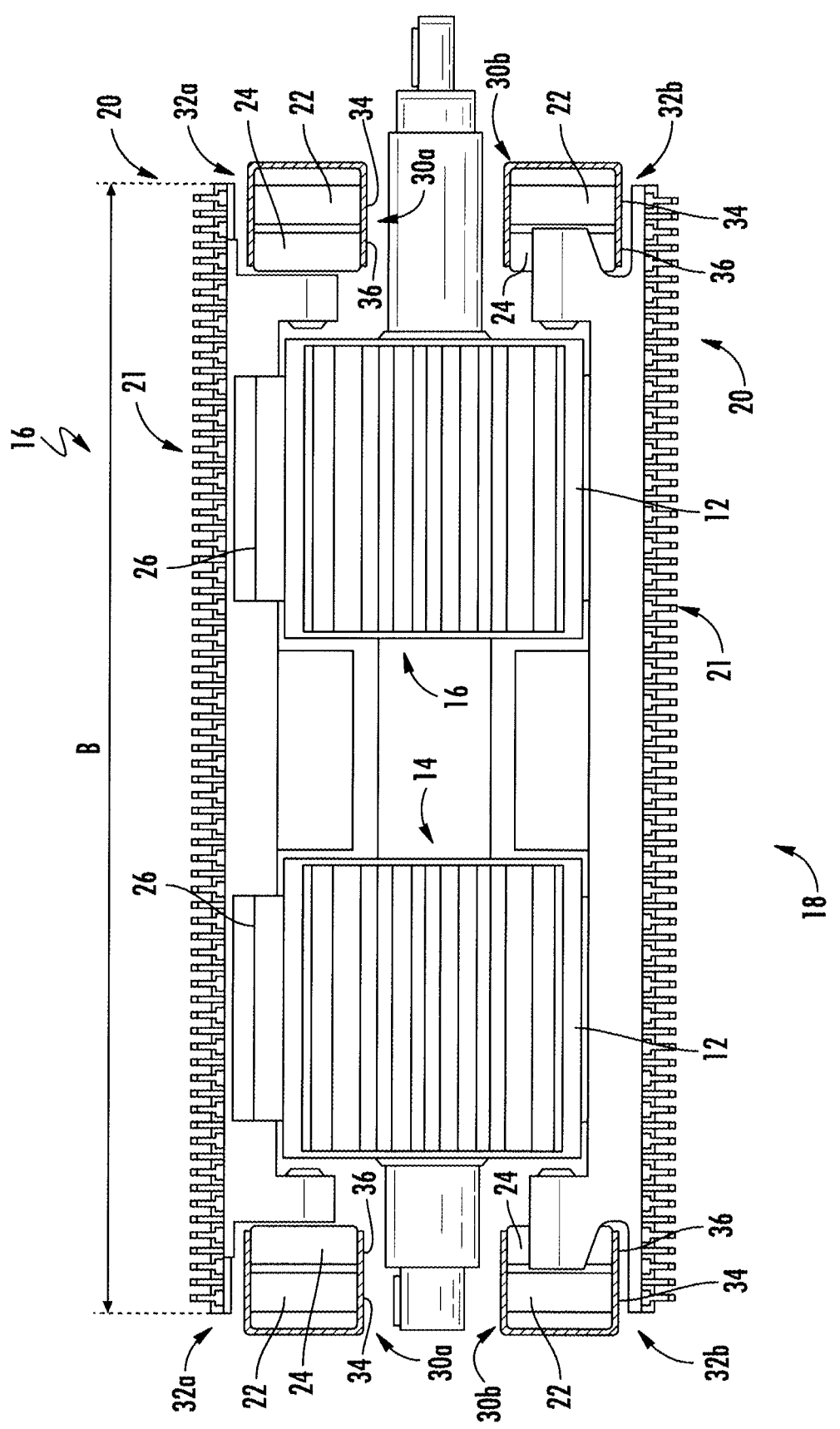
FIG. 6 depicts a sectional view though the conveyance band shown in FIGS. 2 to 5 in a vertical plane extending orthogonally to the conveyance direction.

FIG. 2 schematically depicts a side view of a conveyance band 10 of a moving walkway 1 according to an exemplary embodiment of the invention. FIG. 3 schematically depicts an enlarged side view of a portion of the conveyance band 10 in and adjacent to a turnaround portion 5. FIG. 4 schematically depicts an enlarged perspective view of a portion of the conveyance band 10 in and adjacent to the turnaround portion 5. FIG. 5 schematically depicts a sectional view through the portion of the conveyance band 10 in and next to a turnaround portion 5 in a vertical plane extending parallel to the conveyance direction. FIG. 6 shows a sectional view through the conveyance band 10 in a plane which is oriented orthogonally to the conveyance direction, i.e. the conveyance band 10 travels in the conveyance direction perpendicularly to the plane of FIG. 6.

The conveyance band 10 comprises at least one drive belt 12, in particular a toothed belt 12, extending in the conveyance direction in the upper conveyance portion 16 and the lower return portion 18. In the conveyance portion 16 the pallets 20 travel in the conveyance direction, in the return portion 18 the pallets 20 travel opposite to the conveyance direction.

In each turnaround portion 5, 7 the teeth of the belt 12 engage with a sprocket 14 (see FIG. 5), which is configured for transferring the belt 12 from the conveyance portion 16 into the return portion 18 and/or vice versa. In an alternative embodiment, which is not shown in the figures, a diverter wheel may be used instead of a second sprocket 14 in one of the turnaround portions 5, 7.

At least one of the sprockets 14 is driven by a drive mechanism (not shown) for driving the belt 12.

Figure 9:
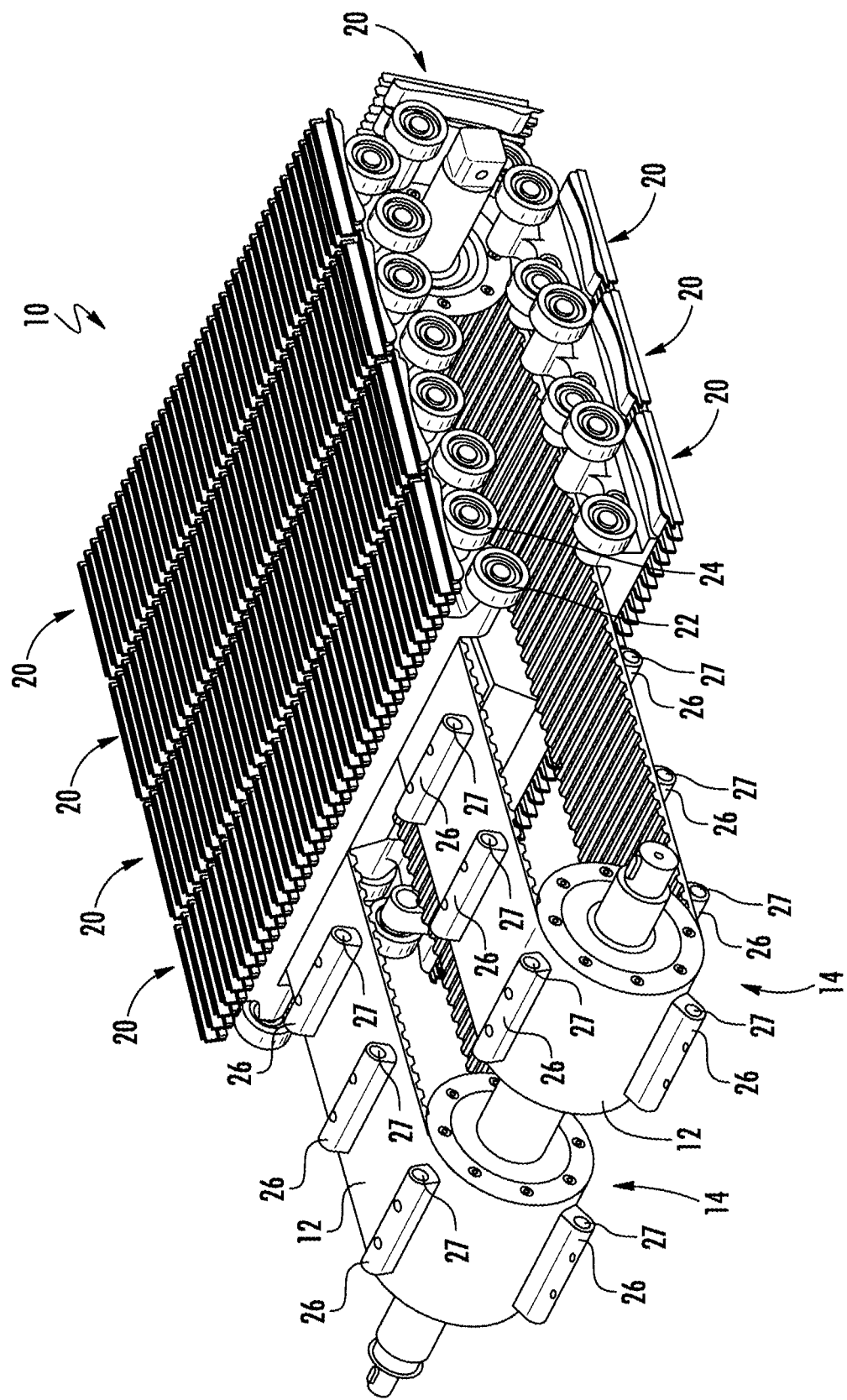
FIG. 9 depicts a perspective view of a conveyance band of a moving walkway according to an exemplary embodiment of the invention, wherein some of the pallets are missing.

As shown in FIG. 6 and FIG. 9 (FIG. 9 will be discussed in more detail further below), the conveyance band 10 according to the exemplary embodiment shown in the figures comprises two belts 12 extending parallel to each other. In consequence, two sprockets 14 are arranged coaxially with other in each turnaround portion 5, 7.

The conveyance band 10 further comprises a plurality of pallets 20 drivingly coupled to the belts 12. Each of the pallets 20 comprises a tread plate 21 for supporting passengers using the moving walkway 1. The tread plates 21 define a width B of the pallets 20 (see FIG. 6). The details of the connection between the pallets 20 and the belts 12 are discussed further below with reference to FIG. 9.

Figure 7:
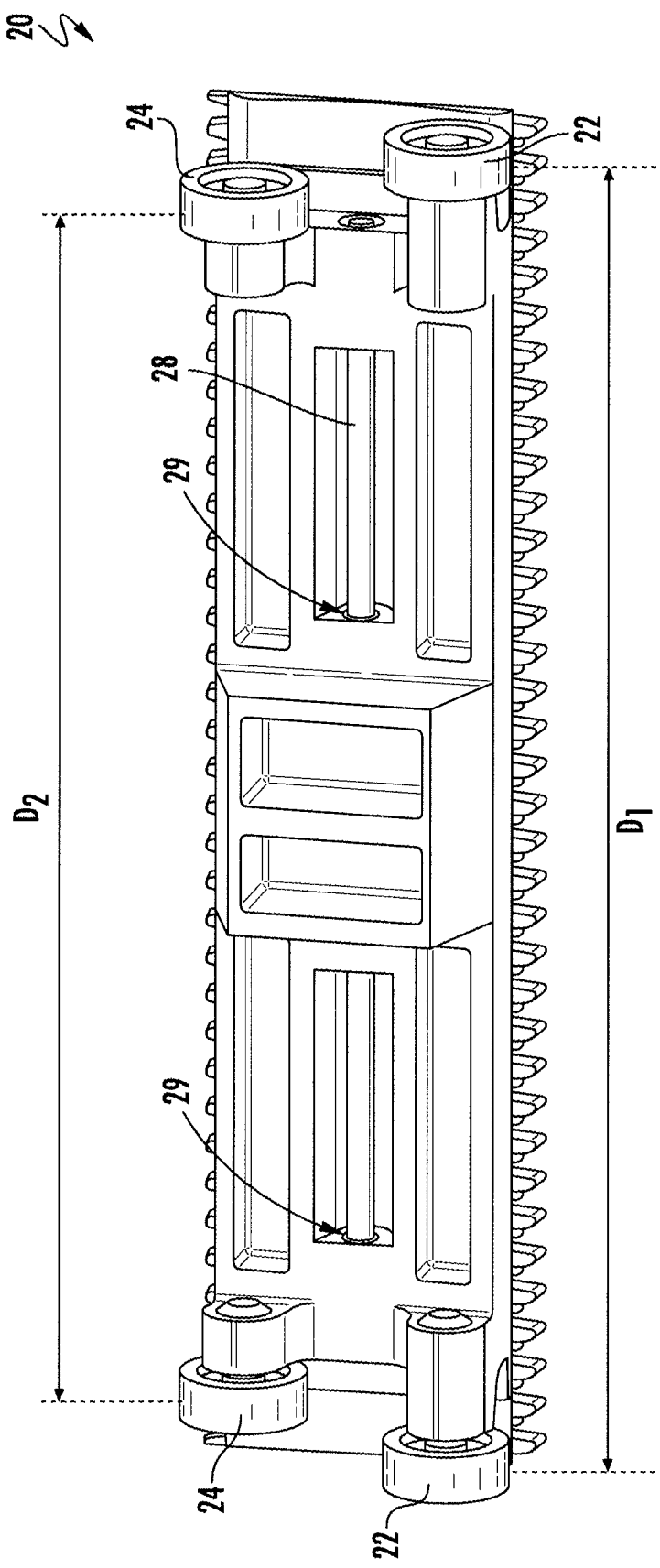
FIGS. 7 and 8 depict a pallet of a conveyance band according to an exemplary embodiment of the invention.
Figure 8:
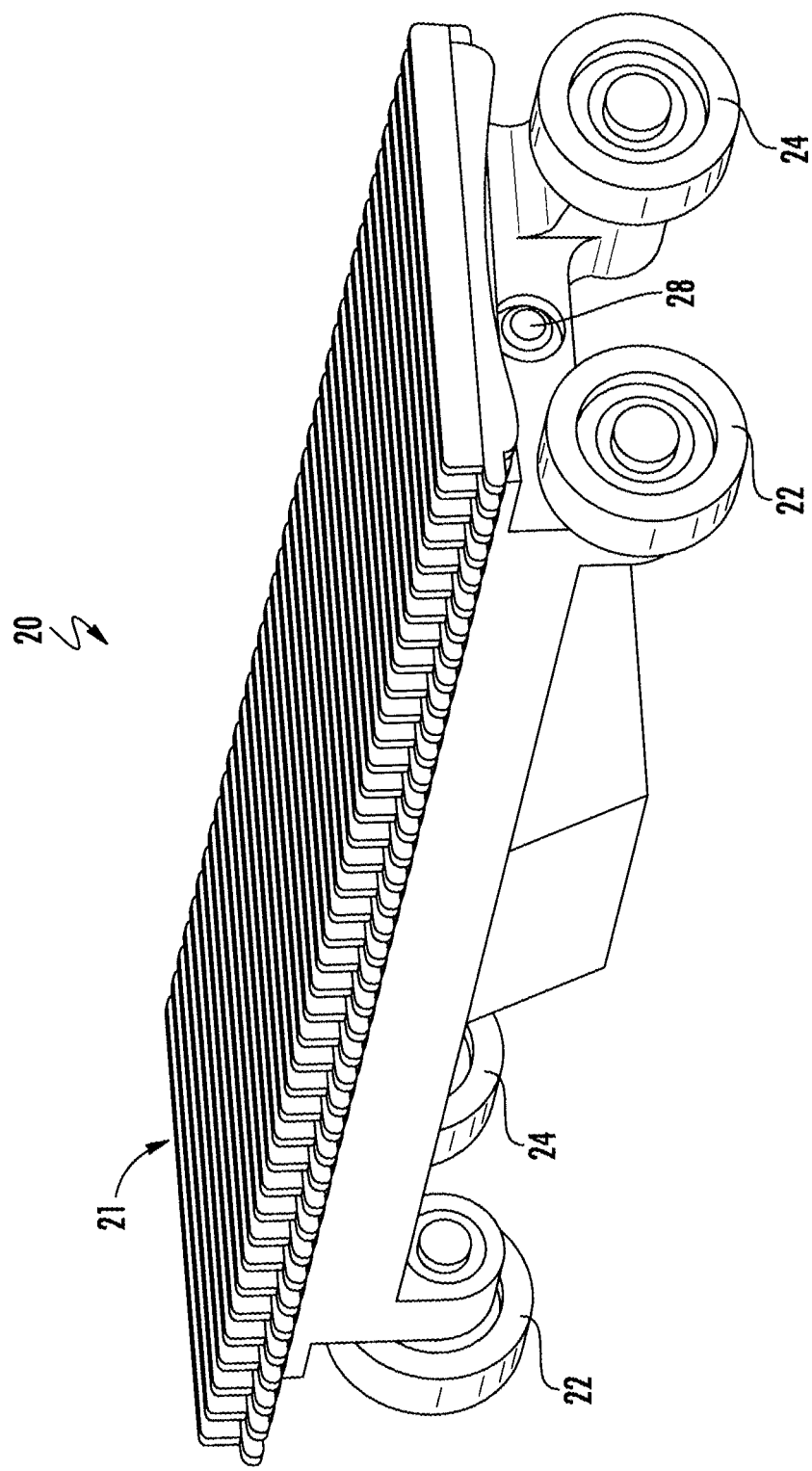

Enlarged perspective views of a pallet 20 according to an exemplary embodiment of the invention are shown in FIGS. 7 and 8.

Each pallet 20 is equipped with four rollers 22, 24, two rollers 22, 24 on each lateral side of the pallet 20. Each pallet 20 in particular is equipped with a pair of first rollers 22 coaxially arranged spaced apart from each other in a lateral direction, i.e. in a direction oriented orthogonally to the conveyance direction, in a distance $D_1$. Each pallet 20 further is equipped with a pair of second rollers 24 coaxially arranged spaced apart from each other in the lateral direction in a distance $D_2 < D_1$ (cf. FIG. 7). All rollers 22, 24 are arranged within the width B of the pallets 20 as defined by the tread plates 21 and therefore do not add anything to the width B of the pallets 20.

Although only a configuration comprising two belts 12 and two pairs of rollers 22, 24 is depicted in the figures, the skilled person will understand that the conveyance band 10 may comprise only one or more than two belts 12 and that each pallet 20 may comprise more than four rollers 22, 24 distributed along the pallet 20 in the conveyance direction and/or in the lateral direction.

As show in FIGS. 3 to 5, a pair of guide rails 30, 32 extends in the conveyance direction on both lateral sides of the moving walkway 1, respectively. Each pair of guide rails 30, 32 comprises a first (inner) guide rail 30 forming a closed loop. The closed loop includes two straight portions 30a, 30b connected to each other by two curved portions 30c, 30d. The curved portions 30c, 30d follow a circular arc having a first radius $R_1$.

Each pair of guide rails 30, 32 further comprises a second (outer) guide rail 32 forming a closed loop. The closed loop includes two straight portions 32a, 32b which are connected to each other by two curved portions 32c, 32d. The curved portions 32c, 32d follow a circular arc having a second radius $R_2 > R_1$ (cf. FIG. 3).

As best visible in FIG. 4, on each lateral side of the conveyance band 10, the first and second guide rails 30, 32 are arranged in a common plane extending parallel to the conveyance direction.

The circular arcs formed by the curved portions 30c, 30d, 32c, 32d of the guide rails 30, 32 are arranged coaxially having a common center C. In order to reduce the diameter $D_0$ of the turnaround portion 5, the common center C of the circular arcs may be shifted from a center P of the sprocket 14 in the conveyance direction, as illustrated in FIG. 3.

As best visible in the perspective view shown in FIG. 4, the guide rails 30, 32 are configured such that only the first (outer) rollers 22 of the pallets 20 are guided by the guide rails 30, 32 in the curved portions 30c, 30d, 32c, 32d of the guide rails 30, 32. In particular, the width and the distance of the guide rails 30, 32 in the lateral direction is set so that the second (inner) rollers 24 of the pallets 20 do not contact the curved portions 30c, 30d, 32c, 32d of the guide rails 30, 32. As a result, the second (inner) rollers 24 may move freely around the turnaround portions 5, 7.

In the straight portions 30a, 30b, 32a, 32b the guide rails 30, 32 have an increased width W in the lateral direction (see FIG. 4). The increased width W may extend over the full length of the straight portions 30a, 30b, 32a, 32b in the conveyance direction, or over a substantial fraction thereof, as in the embodiment depicted in FIG. 4.

In other words, the guide rails 30, 32 respectively comprise at least one first guide rail portion 34 and at least one second guide rail portion 36. In the embodiment depicted in the figures, the second guide rail portions 36 are arranged inside the first guide rail portions 34 in the lateral direction (see in particular FIGS. 4 and 6).

As also best visible in the perspective view shown in FIG. 4, the first guide rail portions 34 are configured for guiding and supporting the first rollers 22 in the conveyance portion 16, in the return portion 18, and in the turnaround portions 5, 7. The second guide rail portions 36 are configured for guiding and supporting the second rollers 24 in the conveyance portion 16 and in the return portion 18, respectively. In consequence, the guide rails 30, 32 guide not only the first (outer) rollers 22 but also the second (inner) rollers 24 when the pallets 20 are located within the conveyance portion 16 and the return portion 18, respectively.

There are no second guide rail portions 36 in the curved portions 30c, 30d, 32c, 32d of the guide rails 30, 32. In consequence, the second rollers 24 may move freely in the turnaround portions 5, 7.

In summary, the first (outer) rollers 22 are guided and supported by the guide rails 30, 32 along the complete path including the curved portions 30c, 30d, 32c, 32d as well as the straight portions 30a, 30b, 32a, 32b. The second (inner) rollers 24 are guided and supported by the guide rails 30, 32 only in the straight portions 30a, 30b, 32a, 32b or a substantial fraction thereof. In the curved portions 30c, 30d, 32c, 32d, the second (inner) rollers 24 are capable to move freely.

The skilled person will understand that in an alternative configuration, which is not shown in the figures, the distance $D_1$ between the first rollers 22 (cf. FIG. 7) may be smaller than the distance $D_2$ between the second rollers 24 ($D_1 < D_2$). In such a configuration, the first rollers 22, which are guided and supported by the guide rails 30, 32 in the complete path, are inner rollers and the second rollers 22, which are not guided in the curved portions 30c, 30d, 32c, 32d, are outer rollers.

As illustrated in FIGS. 4, 6 and 7, the first and second rollers 22, 24 are arranged under the tread plate 21 of the pallet 20 within the width of the pallet 20. Such a configuration allows reducing the total width of the moving walkway 1. The total width of the moving walkway 1 in particular does not considerably exceed the width of the pallets 20.

In the exemplary embodiment shown in the figures, the rollers 22, 24 are arranged outside the belts 12, i.e. the belts 12 are arranged in between the first rollers 22 and the second rollers 24 in the lateral direction (see FIGS. 4, 6, and 9).

In an alternative embodiment, which is not shown in the figures, the belts 12 may be arranged outside of the rollers 22, 24, but still within the width B of the pallets 20 as defined by the tread plates 21, so that the rollers 22, 24 are arranged between the belts 12 in the lateral direction.

In the following, the connection between the pallets 20 and the belts 12 is described in more detail with reference to FIGS. 5, 7, and 9.

FIG. 9 shows a perspective view of a conveyance band 10 of a moving walkway 1 according to an exemplary embodiment of the invention. In order to allow for an unobstructed view onto the belts 12, some of the pallets 20 are not depicted in FIG. 9.

Webs 26 are attached to an outer (back) surface of each belt 12, i.e. to the non-toothed surface of each belt 12, which is not engaged with the sprockets 16. In particular, one web 26 is attached to each belt 12 for every pallet 20.

The webs 26 may be fixed to the belts 12 by screws or bolts extending through the belts 12. Alternatively, the webs 26 may be fixed to the belts 12 using an adhesive, or the webs 26 may be formed integrally with the belts 12.

Each of the webs 26 comprises a bore 27 extending in the lateral direction, in particular orthogonally to the conveyance direction.

The bores 27 are configured for receiving connection elements such as pallet axles 28 extending in the lateral direction through the pallets 20 below the tread plates 21 (see FIGS. 7 and 8).

Thus, the pallets 20 may be drivingly coupled to the belts 12 by aligning bores 29 formed within the pallets 20 (see FIG. 7) coaxially with the bores 27 formed within the webs 26, sliding a connection element such as a pallet axle 28 through the coaxially aligned bores 27, 29 and rotatably fixing the ends of the connection element/pallet axle 28 to the pallet 20.

As a result, the pallets 20 are rotatably coupled to the belts 12. The pallets 20 in particular are rotatable around the connection elements/pallet axles 28. Such a connection allows for a tilting motion of the pallets with respect to the belt(s) 12 in the turnaround portions 5, 7 as it is illustrated in FIGS. 2 to 5 and 9.

This tilting motion in combination with the free movement of the second rollers 24, which are not guided by any guide rails 30, 32 in the turnaround portions 5, 7, allows reducing the diameter $D_0$ of the turnaround portions 5, 7 as well as the diameter d of the first and second rollers 22, 24 (cf. FIGS. 3 and 5).

Thus, exemplary embodiments of the invention provide a moving walkway 1 which needs less space than a conventional moving walkway, in particular in the turnaround portions 5, 7.

In an exemplary embodiment, which is not shown in the figures, the bores 30 extend through a neutral phase of each belt 12, i.e. a portion of the belt 12 which is neither compressed nor expanded when the belt 12 is bent in the turnaround portions 5, 7. Fixing the pallets to a neutral phase of the belt(s) 12 reduces the forces, in particular the shear forces, acting onto the belts 12. This increases the lifetime of the belts 12.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 moving walkway
4 balustrade
5 turnaround portion
6 handrail
7 turnaround portion
10 conveyance band
12 belt
14 sprocket
16 conveyance portion
18 return portion
20 pallet
21 tread plate
22 first roller
24 second roller
26 web
27 bore within the web
28 connection element/pallet axle
29 bore within the pallets
30 inner guide rail
30a, 30b straight portions of the inner guide rail
30c, 30d curved portions of the inner guide rail
32 outer guide tail
32a, 32b straight portions of the outer guide rail
32c, 32d curved portions of the outer guide rail
34 first guide rail portion
36 second guide rail portion
B width of the pallets
C center of the circular arcs
d diameter of the rollers
Do diameter of the turnaround portion
$D_{1/2}$ distance between the first/second rollers
P center of the sprocket
$R_{1/2}$ radius of the curved portions of the first/second guide rail
W width of the guide rails

What is claimed is:

1. Moving walkway comprising:
    at least one endless belt, moving in a conveyance direction along a closed loop, the closed loop comprising a conveyance portion and a return portion extending between opposite turnaround portions;
    a plurality of pallets drivingly coupled to the at least one belt,
    wherein each of the pallets comprises:
        at least one first roller; and
        at least one second roller, the first and second rollers being spaced apart from each other in the conveyance direction;
    the moving walkway further comprising:
        at least one first guide rail portion configured for guiding and supporting the first rollers in the conveyance portion and for guiding and supporting the first rollers continuously through the turnaround portions; and
        at least one second guide rail portion configured for guiding and supporting the second rollers in the conveyance portion and allowing free movement of the second rollers in the turnaround portions.

2. Moving walkway according to claim 1, wherein the first and second guide rail portions are different portions of a common guide rail, or wherein the first and second guide rail portions are provided as separate guide rails.

3. Moving walkway according to claim 1, wherein each pallet is coupled to the belt by a connection element arranged between the first and second rollers in the conveyance direction, wherein each connection element is rotatable with respect to the pallet and/or with respect to the at least one belt.

4. Moving walkway according to claim 1, wherein each of the pallets is coupled to a neutral phase of the at least one belt which is neither compressed nor stretched when the at least one belt is bent in the turnaround portions.

5. Moving walkway according to claim 1, wherein the at least one belt, the first rollers and the second rollers are arranged within the width (B) of the pallets in a lateral direction oriented orthogonally to the conveyance direction.

6. Moving walkway according to claim 1, comprising at least one guide rail including the at least one first guide rail portion, the at least one guide rail having at least one straight portion in the conveyance portion and/or in the return portion, and at least one curved portion 30d, 32c, 32d) in at least one of the turnaround portions.

7. Moving walkway according to claim 6, the at least one guide rail comprising the at least one first guide rail portion and the at least one second guide rail portion.

8. Moving walkway according to claim 6, wherein the at least one guide rail has a larger width (W) in the lateral direction in the at least one straight portion than in the at least one curved portion.

9. Moving walkway according to claim 6, comprising first and second guide rails respectively having curved portions in the turnaround portions, each curved portion following a circular arc, wherein a radius ($R_1$) of the curved portions of the first guide rail is smaller than a radius ($R_2$) of the curved portions of the second guide rail.

10. Moving walkway according to any of claim 9, wherein the circular arcs of the curved portion have a common center (C).

11. Moving walkway according to claim 10 wherein said common center (C) is shifted in the conveyance direction from a center (P) of at least one sprocket which is engaged with the at least one belt.

12. Moving walkway according to claim 1, wherein each pallet comprises at least two first rollers and at least two second rollers.

13. Moving walkway according to claim 12 wherein each pallet comprises a first roller and a second roller at each lateral side, respectively.

14. Moving walkway according to claim 12, wherein the at least two first rollers are arranged coaxially with each other and/or wherein the at least two second rollers are arranged coaxially with each other.

15. Moving walkway according to claim 12, wherein the distance ($D_1$) between the first rollers in the lateral direction differs from the distance ($D_2$) between the second rollers in the lateral direction.

16. Moving walkway according to claim 1 comprising at least two belts, wherein each pallet is coupled to each of the belts.

17. Moving walkway according to claim 16, wherein the first and second rollers are arranged outside the at least two belts in the lateral direction, or wherein the first and second rollers are arranged between the at least two belts in the lateral direction.

18. Moving walkway according to claim 1 wherein the endless belt comprises a toothed belt.

19. Moving walkway comprising:
    at least one endless belt moving in a conveyance direction along a closed loop, the closed loop comprising a conveyance portion and a return portion extending between opposite turnaround portions;
    a plurality of pallets drivingly coupled to the at least one belt,
    wherein each of the pallets comprises:
        first rollers positioned on opposite sides of the pallet and configured to rotate about a first axis; and
        second rollers positioned on opposite sides of the pallet and configured to rotate about a second axis different from the first axis; and
        the first and second rollers being spaced apart from each other in the conveyance direction;
        wherein the distance ($D_1$) between the first rollers in the lateral direction differs from the distance ($D_2$) between the second rollers in the lateral direction;
    the moving walkway further comprising:
        at least one first guide rail portion configured for guiding and supporting the first rollers in the conveyance portion and through the turnaround portions; and
        at least one second guide rail portion configured for guiding and supporting the second rollers in the conveyance portion and allowing free movement of the second rollers in the turnaround portions.

\* \* \* \* \*